United States Patent [19]
Ibe et al.

[11] Patent Number: 5,126,084
[45] Date of Patent: Jun. 30, 1992

[54] METHOD AND APPARATUS FOR CHARGING HIGH-VISCOUS MATERIAL

[75] Inventors: Hiromitu Ibe, Kosai; Kenji Matumoto, Hamamatsu; Toshikatsu Nakashima, Anjo; Masato Oda, Gamagori, all of Japan

[73] Assignee: Asmo Co., Ltd., Kosai, Japan

[21] Appl. No.: 659,087

[22] Filed: Feb. 22, 1991

[30] Foreign Application Priority Data

Feb. 26, 1990 [JP] Japan .................................. 2-45080

[51] Int. Cl.⁵ .............................................. B29B 9/00
[52] U.S. Cl. .................................... 264/102; 264/140; 264/141; 425/73; 425/377; 425/382 R
[58] Field of Search ................ 264/102, 140, 141, 69, 264/13; 425/6, 73, 238, 239, 289, 377, 380, 382 R, 445, 446, 461, 464

[56] References Cited

U.S. PATENT DOCUMENTS

| 2,749,590 | 6/1956 | Kilpatrick | 264/102 |
| 3,086,243 | 4/1963 | Bergmeister et al. | 264/140 |
| 3,267,517 | 8/1966 | Altermatt | 425/73 |
| 3,336,008 | 8/1967 | Zoethout | 264/102 |
| 4,156,495 | 5/1979 | Weinhold | 264/13 |
| 4,205,030 | 5/1980 | Menshutin et al. | 264/40.1 |
| 4,559,000 | 12/1985 | Froeschke | 425/6 |
| 4,954,303 | 9/1990 | Moore et al. | 264/101 |

FOREIGN PATENT DOCUMENTS 58-183402 10/1983 Japan .
63-33202 2/1988 Japan .

OTHER PUBLICATIONS

Abstract of JP 63-311, Jan. 5, 1988.
Abstract of JP 63-92639, Apr. 23, 1988.

Primary Examiner—Mary Lynn Theisen
Attorney, Agent, or Firm—Burns, Doane, Swecker & Mathis

[57] ABSTRACT

The present invention relates to a method and apparatus for charging a high-viscous material in a material tank into a charging tank. The high-viscous material, namely, putty is used preferably as a material for correcting the dynamic unbalance of a rotary body. When the material is charged from the material tank into the charging tank through a nozzle, the pressure of air in the charging tank is reduced and the pressure of air in the material tank is increased to drop the high-viscous material in droplets without taking air thereinto and air which has permeated into the material in the material tank can be removed.

12 Claims, 7 Drawing Sheets

METHOD AND APPARATUS FOR CHARGING HIGH-VISCOUS MATERIAL

BACKGROUND OF THE INVENTION

1. Field of the Invention

The present invention relates to a method and an apparatus for charging a high-viscous material, namely, putty into a service tank, or a putty tank. The putty is used as a material for correcting the dynamic unbalance of a rotary body. The putty is supplied from the putty tank to a rotary body little by little.

2. Description of the Related Art

The putty is attached to a necessary portion of a rotary body so as to use it as a weight for correcting the dynamic unbalance of the rotary body. The viscosity of the putty is as high as more than 4000 poise (at 30° C.) and has thixotropy so that it is not deformed or scattered even though the rotary body rotates. Thixotropy is that viscosity becomes low when the putty is moved by external force and becomes high when it is left to stand. The putty is used in an amount as small as several milligrams to several grams per rotary body. Therefore, the putty is supplied little by little from the putty tank to the rotary body through a nozzle by a microgear pump.

The amount of the putty to the putty tank is limited because it has thixotropy and is supplied therefrom to the rotary body by the microgear pump. Therefore, when the amount thereof becomes small, the putty tank is required to be replenished. However, the replenishment of the putty into the tank is accompanied by difficulty due to the high viscosity of the putty.

In order to overcome this problem, the putty is put into the putty tank with a tool such as a spoon or a spatula or the putty is squeezed out of a vinyl bag into the putty tank after it is put into the vinyl bag. Otherwise, the putty is fed into the tank by a high compression pump.

However, according to the above conventional method for charging the putty into the tank, plenty of air is taken into the tank with the charge or feeding of the putty into the tank. Therefore, the following phenomena occur when a high-viscous material such as the putty is discharged from the tank by a microgear pump and the like.

1. Only air is discharged from the tank while the putty is not discharged therefrom.
2. The amount of the putty discharged from the tank is not uniform before and after the putty is not discharged from the tank due to the existence of air which is taken into the tank in putty charging operation as well as air which is in the tank prior to the charge of the putty into the tank.
3. In discharging the putty from the charging tank, compressed air in the putty forces the putty to extrude from the nozzle even though the discharge pressure is set to zero.
4. The amount of the putty discharged from the tank becomes nonuniform according to the fluctuation of air which has permeated into the putty.

As described above, due to air which has permeated into the tank, the discharge amount of the putty does not accord with a predetermined amount, the discharge of the putty from the tank is interrupted, or the putty is discharged undesirably. As a result, an operation for correcting the dynamic unbalance of the rotary body cannot be appropriately accomplished.

In order to solve this problem, Japanese Patent Laid-Open Publications No. 58-183402 and 63-33202 disclose methods for sucking a high-viscous material, or putty into the tank by generating a negative pressure in the tank.

However, the above methods have the following problems:

1. It is impossible to remove air which has permeated into the high-viscous material being prepared.
2. When a negative pressure is generated in the tank to suck the putty into the tank, the maximum gauge pressure is minus one atmosphere, so that this method cannot be carried out for the high-viscous material of more than 4000 poise.

SUMMARY OF THE INVENTION

It is the essential object of the present invention to provide a charging method and apparatus for charging a high-viscous material such as putty, highly viscous and having thixotropy, used as a material for correcting the dynamic unbalance of a rotary body.

It is another object of the present invention to discharge the putty from the tank according to a predetermined amount with a high accuracy.

In accomplishing these and other object, there is provided a charging apparatus comprising:

a material tank for extruding a high-viscous material from a discharge opening in a pressure-applied state by a pressure applying piston removably provided on the material tank;

a nozzle, connected with the discharge opening of the material tank, for discharging said high-viscous material;

a charging tank into which the high-viscous material extruded and dropped from the material tank is charged;

an exhaust adaptor mounted on the charging tank and connected with the discharge opening of the nozzle; and a pump, connected with the exhaust adaptor, for exhausting air in the charging tank and the exhaust adaptor so as to provide a pressure-reduced state.

There is provided a method for charging a high-viscous material in a material tank into a charging tank comprising the steps of:

connecting the charging tank with an exhaust pump through an exhaust adaptor;

pressurizing air in the high-viscous material tank with air in the charging tank is being exhausted;

extruding, through a nozzle, the high-viscous material compressed by pressure application in the material tank to the charging tank in a pressure-reduced state; and dropping the high-viscous material in droplets.

According to the charging method and apparatus of the present invention, the pressure of air in the charging tank is reduced and the pressure of air in the material tank is increased to drop the high-viscous material in droplets from the material tank to the charging tank. Therefore, the high-viscous material can be charged into the charging tank without taking air thereinto and air which has permeated into the high-viscous material in the material tank can be removed. Even a high-viscous material of more than as high as more than 4000 poise can be easily and effectively charged into the charging tank in a short period of time.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
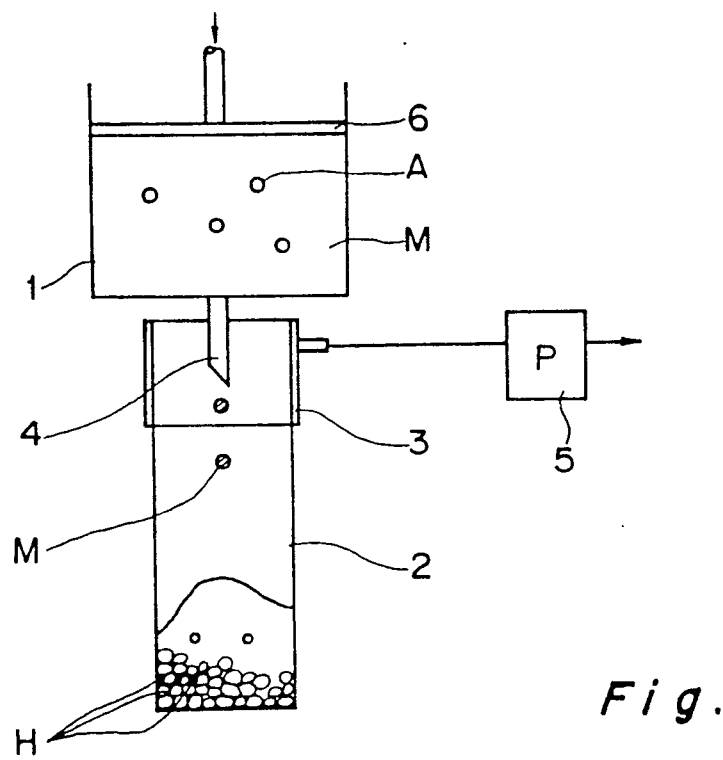
FIG. 1 is a schematic diagram for describing a charging apparatus and the principle of a charging method carried out by using the apparatus according to the present invention.

Before the description of the present invention proceeds, it is to be noted that like parts are designated by like reference numerals throughout the accompanying drawings.

Figure 2:
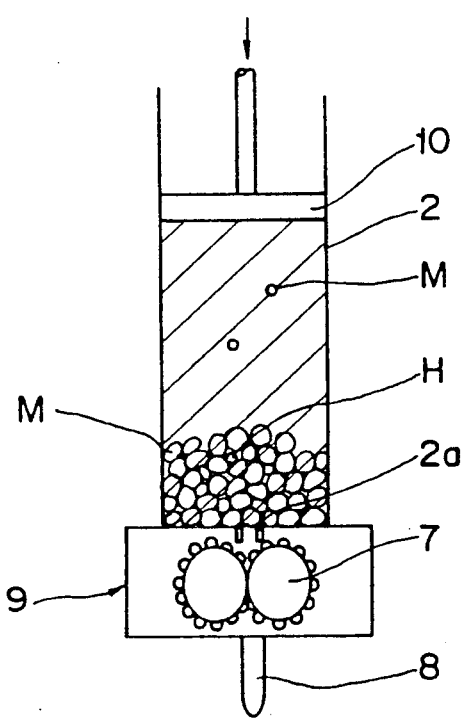
FIG. 2 is a schematic diagram showing an example of a charging tank in which putty has been charged by the charging apparatus of the present invention.
Figure 3:
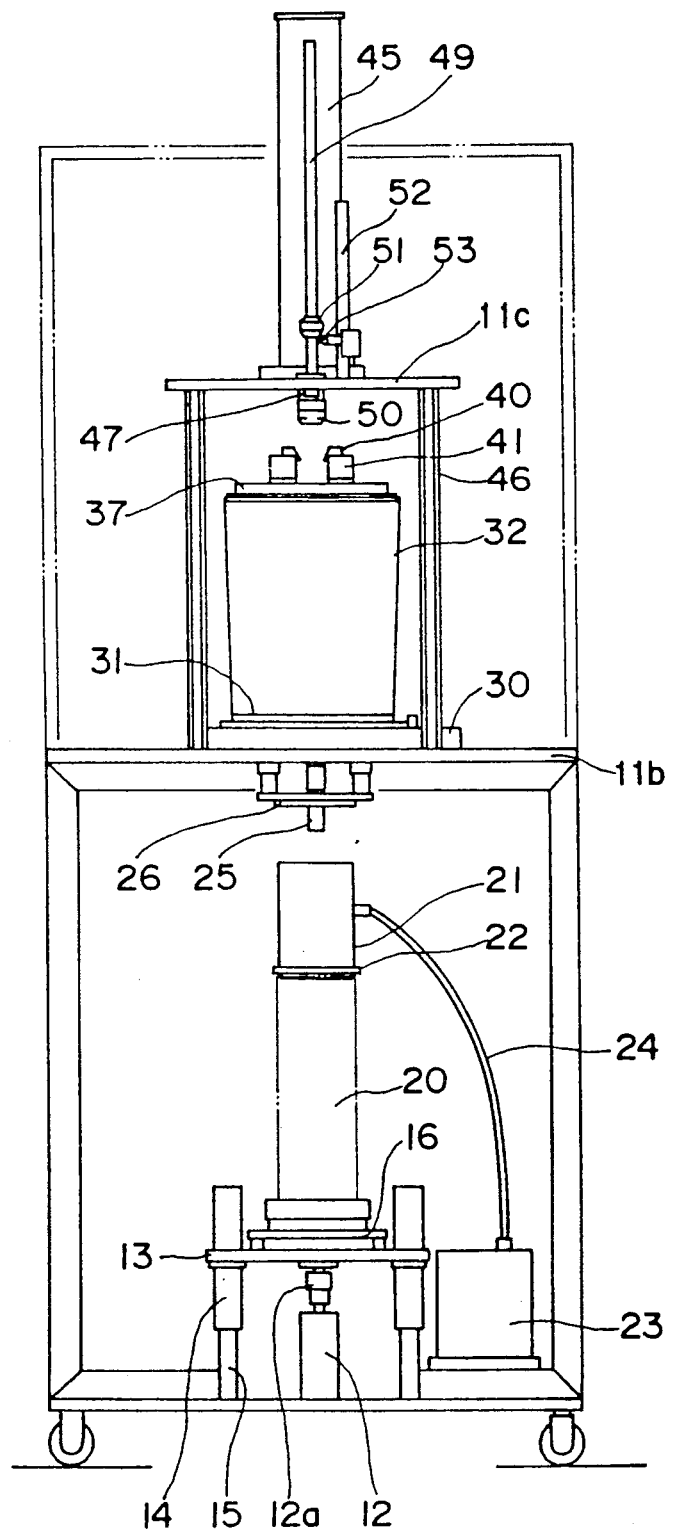
FIG. 3 is a front view showing a charging apparatus according to an embodiment of the present invention.
Figure 4:
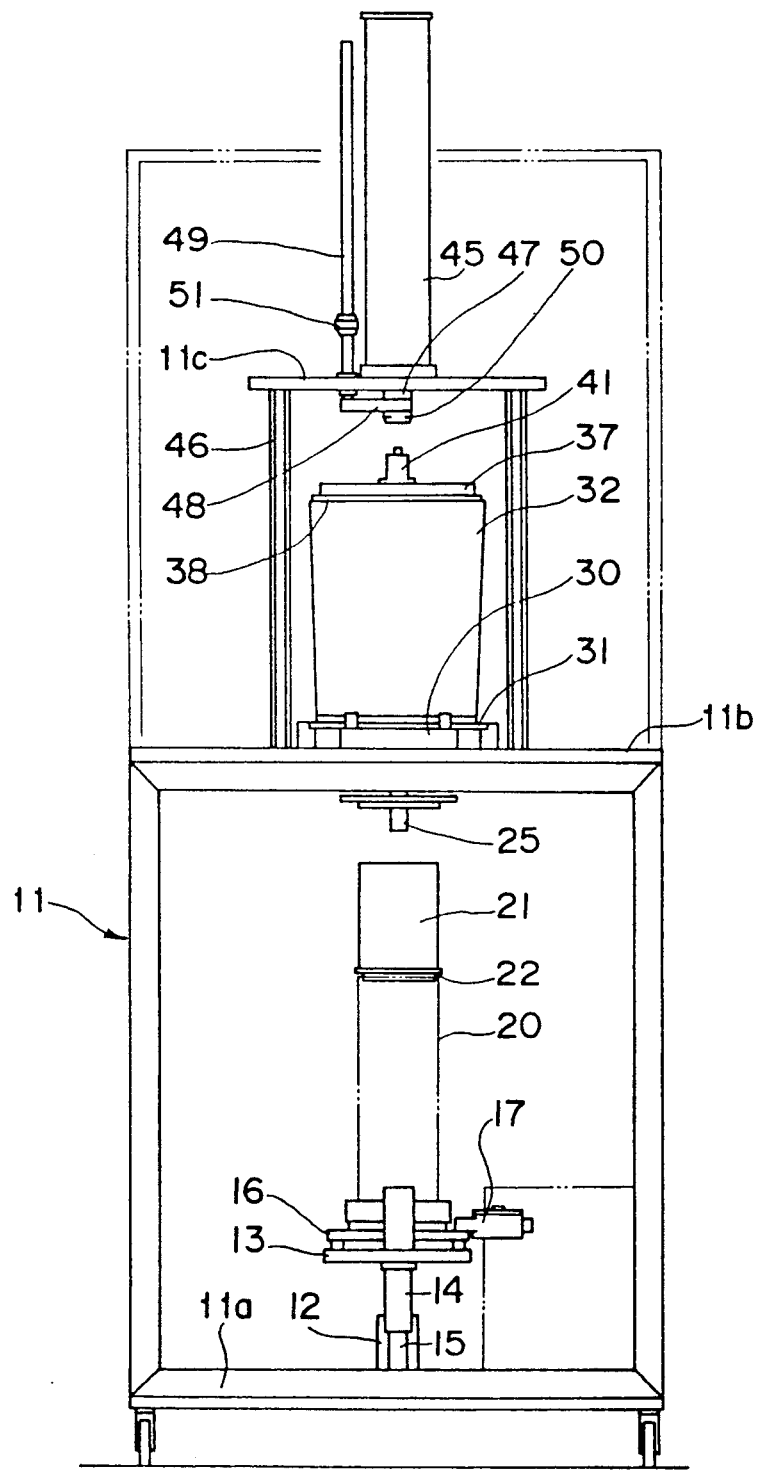
FIG. 4 is a side elevation of the apparatus shown in FIG. 3.
Figure 5:
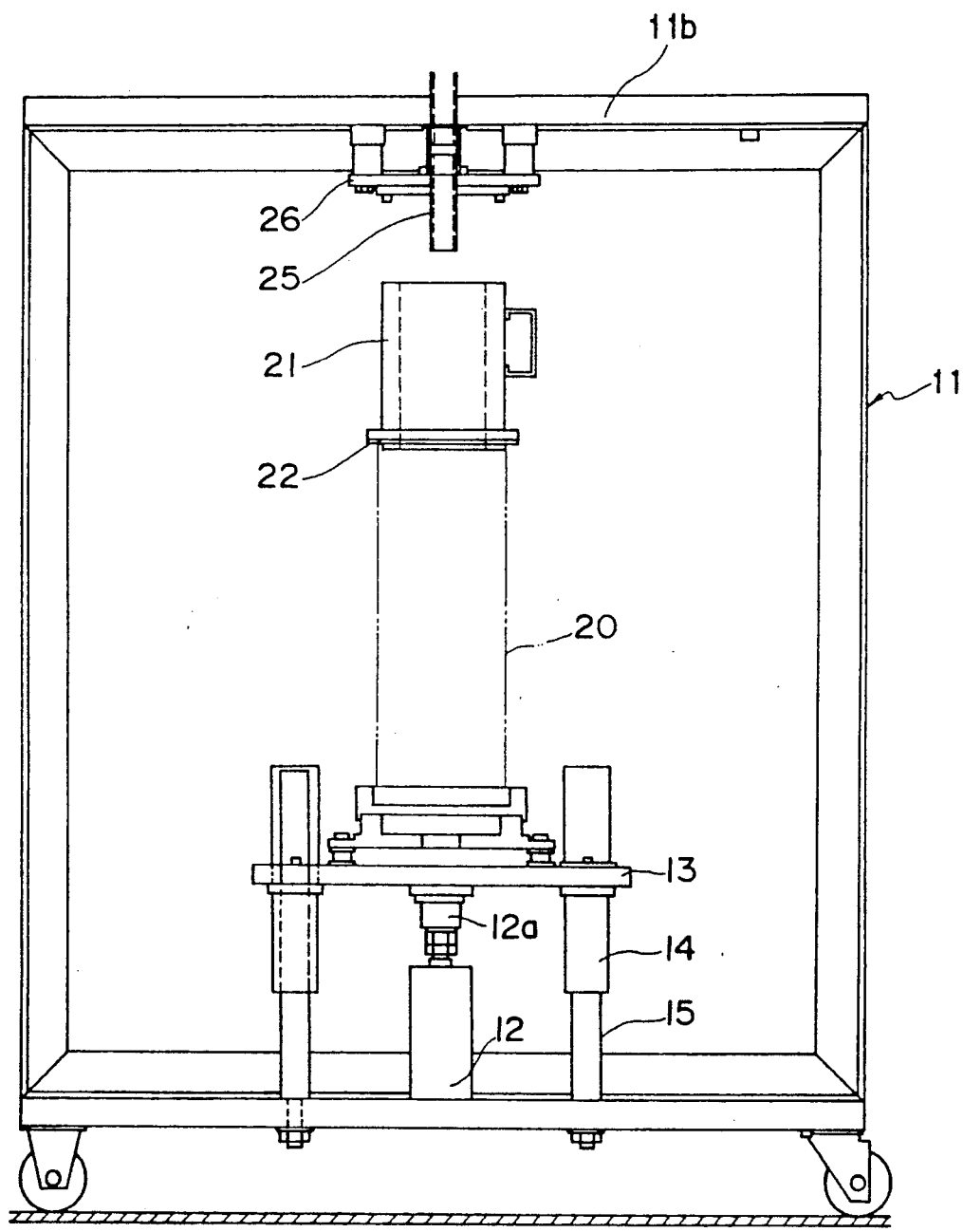
FIG. 5 is an enlarged view of the lower half of the apparatus shown in FIG. 3.
Figure 6:
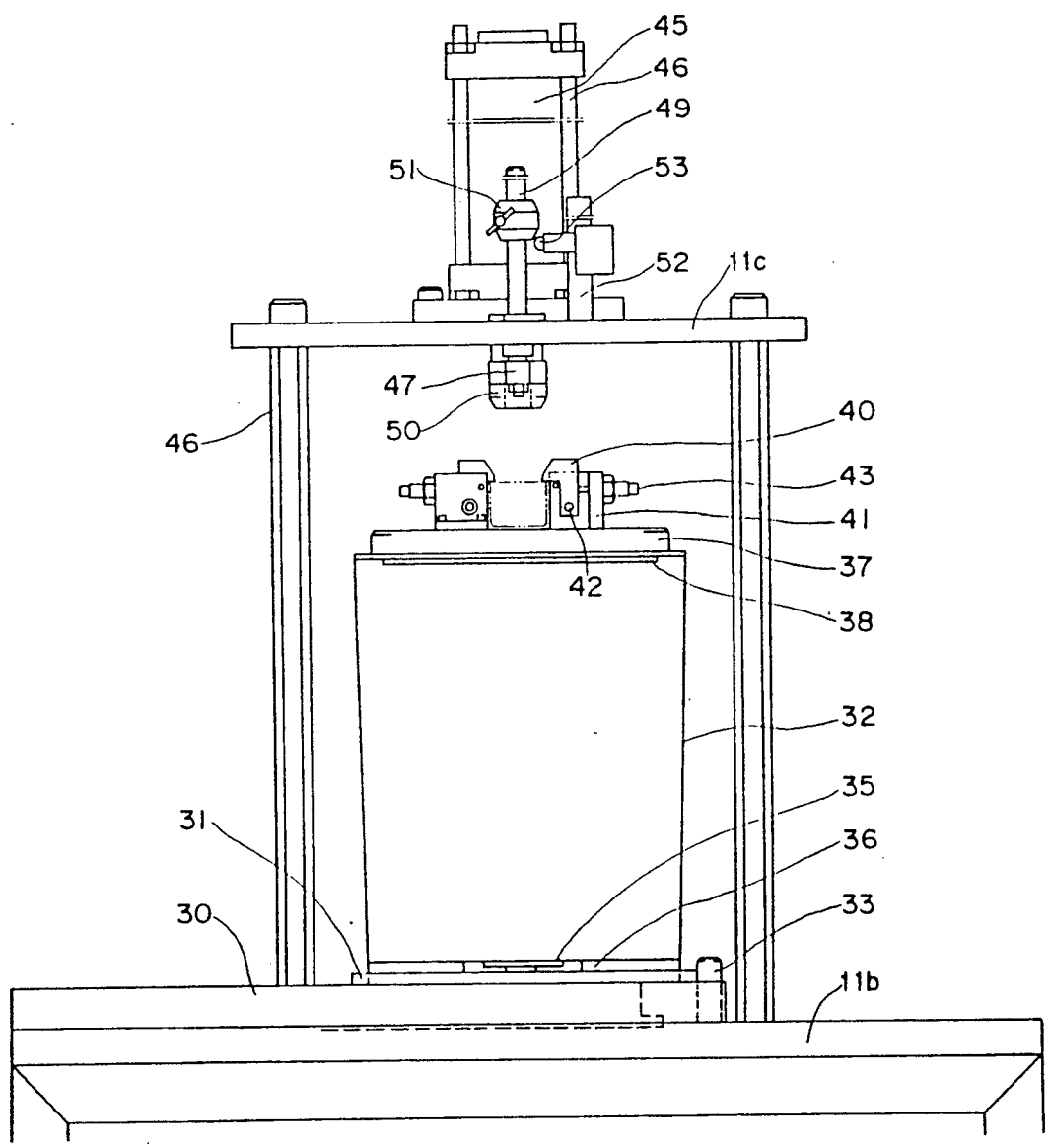
FIG. 6 is an enlarged view of the upper half of the apparatus shown in FIG. 3.

The outline construction and operation principle of the present invention are described with reference to FIGS. 1 and 2.

A charging apparatus according to the present invention comprises a material tank 1, a charging tank 2, and an exhaust adaptor 3 mounted on the upper of the charging tank 2, and a charging nozzle 4 inserted into the exhaust adaptor 3. The nozzle 4 is fixed to the bottom surface of the material tank 1 so that the material tank 1 is airtight.

A vacuum pump 5 is connected with tee adaptor 3 so that a negative pressure of several millimeters of mercury is generated in the charging tank 2 and the air therein is exhausted. This condition prevents air from permeating into a material, namely, a high-viscous material (M), when it is charged into the charge tank. The material (M) in the material tank 1 is compressed by a piston 6 so as to extrude material (M) in droplets from the material tank 1 into the adaptor 3 through the nozzle 4.

According to this construction, first, material (M) is extruded through the nozzle 4. If air (A) has permeated into material (M), the volume of air (A) expands rapidly as soon as air is discharged from the nozzle 4 into the adaptor 3 having a negative pressure, because air (A) has been compressed by the piston 6, thus jetting out of material (M). Then, air (A) is discharged to the outside by the vacuum pump 5, and the discharge of air is repeated by said operation. Thus, air (A) which has permeated into material (M) from the outset is released.

Material (M) which has been extruded in droplets through the nozzle 4 is crushed by the rapid expansion of air (A), thus falling into the charging tank 2 by gravity. If air is not in material (M), it drops into the charging tank 2, thus accumulating therein. Air inside the charging tank 2 is exhausted by the vacuum pump 5 when material (M) is fed into the charging tank 2. Therefore, air does not permeate into material (M).

If cavities (H) are formed in material (M) which has accumulated in the charging tank 2 because of the pressure reduction, cavities (H) can be crushed by a vibrator 17 which vibrates the charging tank 2, and released by a pressure which applies to cavities (H) when material (M) is discharged from the charging tank 2. More specifically, as shown in FIG. 2, when the dynamic unbalance of a rotary body (not shown) is being corrected, the charging tank 2 accommodating material (M) is mounted on a discharge device 9 comprising a microgear pump 7 and a discharge nozzle 8, and a pressure applying piston 10 is mounted on the charging tank 2 so that the piston applies pressure thereto. The microgear pump 7 is rotated while pressure is being applied by the piston 10 to the charging charging tank 2 so that material (M) is discharged from a material extruding portion 2a provided on the bottom surface of the charging tank 2 through a nozzle 8. In this manner, cavities (H) are removed by the pressure applied by the piston 10 to the charging charging tank 2 and the rotation of the microgear pump 7.

As described above, material (M) is charged from the material tank 1 into the charging tank 2 by generating a negative pressure in the charging tank 2 while the pressure of air in the material tank 1 is increased. Therefore, a high-viscous material of more than 4000 poise can be sucked from the material tank 1 to the charging tank 2 even though the charging tank 2 provides a negative pressure as low as minus one atmosphere in gauge pressure. In this operation, air is prevented from entering into the charging tank 2. Moreover, air which has permeated into the material (M) from the outset can be removed and cavities (H) formed in the material which have accumulated in the charging tank 2 can be removed.

The high-viscous material consisting of a one-can epoxy resin compound is preferably used to correct the dynamic unbalance of a rotary body. The one-can epoxy resin compound contains as main components an epoxy resin, a hardening agent, a hardening accelerator, an inorganic filler, and a thixotropy imparting agent. The hardening agent is dicyandiamide or organic dibasic acid dihydrazide. The hardening accelerator is a compound containing a tertiary amino group obtained by the reaction of multifunctional epoxy compound, a compound whose molecule contains a tertiary amino group and one or more active hydrogens, and carboxylic anhydride.

The thixotropy imparting agent is contained in the high-viscous material so that the thixotropy exponential thereof at 30° C. is more than 1.4.

An apparatus according to embodiments of the present invention will be described with reference to FIG. 3 through FIG. 11.

An air cylinder 12 is mounted on a lower base plate 11a of a frame 11. A lift plate 13 is fixed to the top of a rod 12a projecting upward from the air cylinder 12. A linear bush 14 is fixed to the lift plate 13 and slidably inserted into a linear shaft 15 projecting from the base plate 11a so as to guide the lift plate 13 in its upward and downward movement. A setting plate 16 is mounted on the upper surface of the lift plate 13 and a charging tank 20 is removably provided on the plate 16. An exhaust adaptor 21 sealed with a packing 22 is mounted on the charging tank 20. The adaptor 21 is removably connected with a vacuum pump 23 attached to the frame 11 via a vacuum hose 24. A vibrator 17 is mounted on the plate 16 so as to vibrate the charging tank 20.

Figure 7:
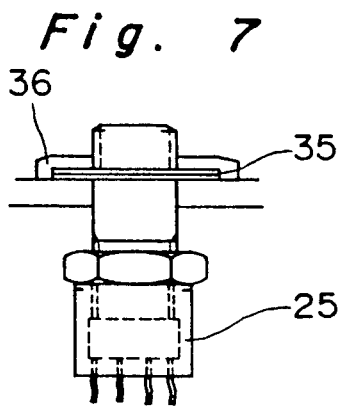
FIG. 7 is an enlarged view of a nozzle mounting portion.
Figure 8:
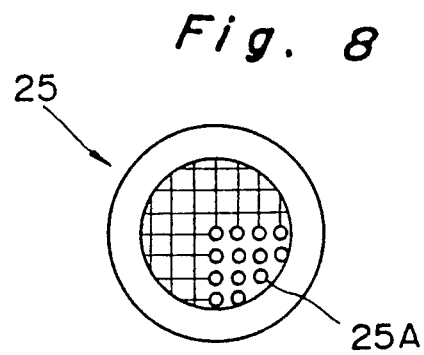
FIG. 8 is an enlarged view of the discharge opening of a nozzle.

A stopper plate 26 is fixed to the lower surface of a center plate 11b positioned in the center of the frame 11. A nozzle 25 penetrates through the center plate 11b and the stopper plate 26. The adaptor 21 is pressed against the stopper plate 26 in its upward movement. As shown in FIG. 8, the nozzle 25 has many small discharge pores 25A formed on the discharge opening disposed on the lower surface thereof. A high-viscous material, namely, putty is crushed and extruded from the small discharge pores 25A, thus falling in droplets as shown in FIG. 7. The nozzle 25 may be provided with a mesh sheet having latticed openings instead of the small discharge pores 25A. The inner diameter of the nozzle 25 is set depending on the viscosity and the feeding speed of the putty. That is, if the putty is fed from a material tank 32 to the charging tank 20 at a fast speed, the nozzle 25 of a small diameter is used. The provision of the mesh sheet in the nozzle 25 prevents air from entering thereinto.

A lifter 30 of the material tank 32 is fixed to the upper surface of the center plate 11b. The material tank 32 is set on the lifter 30 by a fixing jig consisting of a knock pin 33 through a putty plate 31. The material tank 32 consists of a cylindrical pail can having a hole in the center of the bottom surface thereof. The material tank 32 is mounted on the lifter 30 so that the nozzle 25 is inserted into the hole. In order to prevent the leakage of the putty accommodated in the material tank 32 from the gap between the hole and the nozzle 25, a ring base 36 comprising an O ring is provided on the bottom surface of the material tank 32 so that the O ring is in the periphery of the hole. A pressure applying piston 37 is removably mounted on the upper surface of the material tank 32 with the putty accommodated therein. A rubber packing 38 for keeping the material tank 32 airtight is fixed to the piston 37 which slidably reciprocates in the material tank 32. A pair of hooks 40 for locking a pusher is mounted on the upper surface of the piston 37 so that the hooks 40 are rotatably supported on a holder 41 with a pin 42 and urged by a spring plunger 43.

An air cylinder 45 for pressing the piston 37 is mounted on a top plate 11c fixed to the upper end of a shaft 46 projecting from the center plate 11b of the frame 11. A pusher 50 is fixed to the lower end of the piston rod 47 of the air cylinder 45. A linear shaft 49 is coupled to the piston rod 47 through a coupling plate 48. A putty capacity adjusting dock 51 is mounted on the linear shaft 49. A limit switch 53 is mounted on a stay 52 projecting from the top plate 11c.

The lifter 30 of the material tank 32 is provided on the center plate 11b because it is difficult to place the material tank 32 at a predetermined position because the weight of the material tank 32 is more than 25~30 kg and the putty discharge hole is provided on the bottom portion of the material tank 32. That is, the material tank 32 is lifted to a predetermined position by a device not shown, placed on the putty plate 31, slided to a predetermined position by a roller mounted on the lower surface of the putty plate 31, placed in position, and then, the lifter 30 is moved downward to keep the gap between the material tank 32 and the putty plate 31 airtight.

The limit switch 53 is opened and closed according to the position of the dock 51, thus controlling the amount of a high-viscous material, namely, putty to be fed into the charging tank 20 and automating a material feeding operation. That is, if the putty is charged into the tank 2 too much, the discharge adaptor 21 is filled with the putty as well. As a result, the putty penetrates into the vacuum pump 23. Such a disadvantage can be eliminated by the provision of the limit switch 53.

The method for charging the putty from the material tank 32 into the charging tank 20 is described below.

First, the putty plate 31 is placed on the lifter 30 and the material tank 32 is set on the putty plate 31. The piston 37 is mounted on the material tank 32. Then, the lifter 30 is moved downward and the nozzle 25 is set on the material tank 32.

The tank 20 is set on the plate 16 mounted on the lift plate 13. The adaptor 21 is mounted on the upper portion of the tank 20. The adaptor 21 is connected to the vacuum pump 23 through the vacuum hose 24.

Then, the rod 12a of the air cylinder 12 is moved upward and then, the tank 20 and the adaptor 21 are moved upward to bring the adaptor 21 in close contact with the stopper plate 26. Thereafter, the air cylinder 45 is actuated to move the rod 47 downward, and the pusher 50 is locked by the hook 40 fixed to the upper surface of the piston 37 and the dock 51 is mounted on the linear shaft 49.

Thereafter, the vacuum pump 23 is actuated to exhaust air in the adaptor 21 and the tank 20. The air cylinder 45 is actuated to move the rod 47 downward and the piston 37, and the vibrator 17 is actuated.

Due to the downward movement of the piston 37, air in the material tank 32 is pressurized in the range of $0.1 \sim 5$ kg/cm$^2$ according to this embodiment. As a result, the putty is extruded from the material tank 32 into the adaptor 21 through the nozzle 25.

The putty inside the material tank 32 is fed into the charging tank 20 in droplets by the pressure applied by the air cylinder 45 and the pressure reduced by the vacuum pump 23. Since the vibrator 17 vibrates the charging tank 20, decompression-caused cavities can be prevented from being formed in the putty accommodated in the charging tank 20 and air bubbles in the putty are moved upward, thus escaping from the charging tank 20 through the adaptor 21.

When the feeding of the putty from the material tank 32 into the charging tank 20 is completed, the operation of the vacuum pump 23 and the vibrator 17 are stopped. Then, the rod 12a of the air cylinder 12 is moved downward to move the lift plate 13 downward to remove the charging tank 20 from the plate 16.

Although not used in this embodiment, a means for heating the material tank 32 may be provide to facilitate the extrusion of the putty therefrom.

Figure 9:
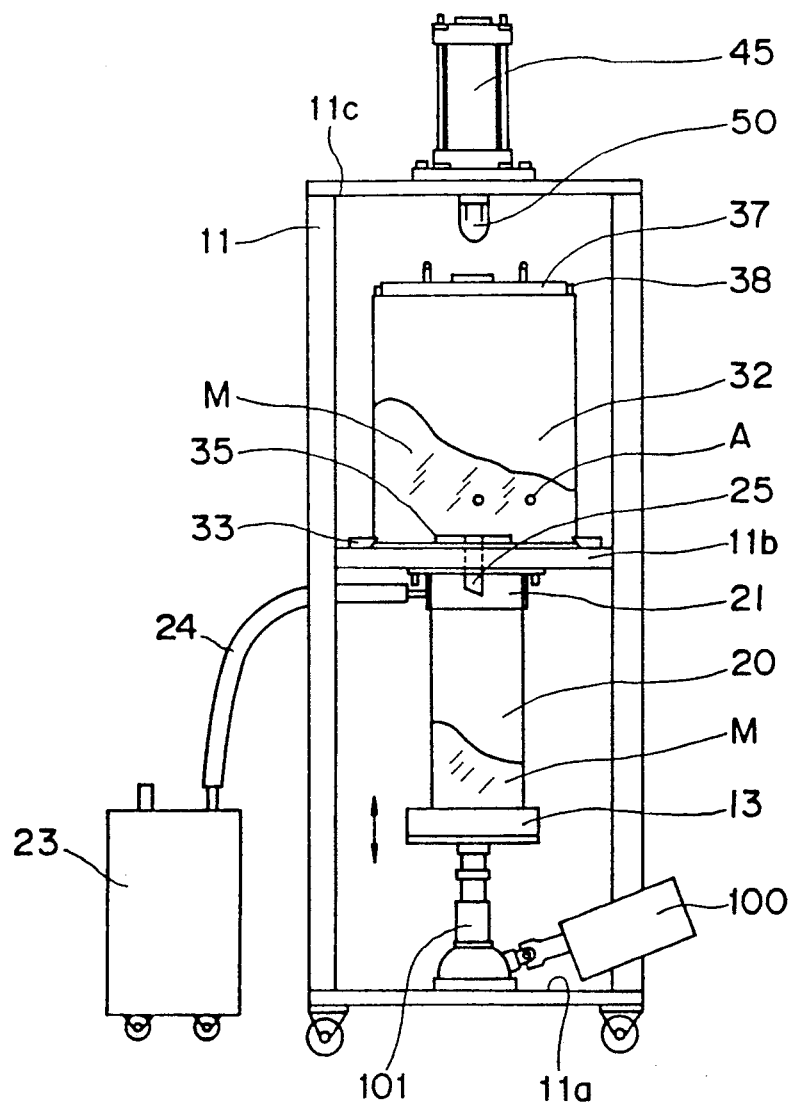
FIG. 9 is a front view showing a charging apparatus according to another embodiment of the present invention.

FIG. 9 schematically shows an apparatus according to another embodiment. A jack 101, operated by a motor 100, serving as a mechanism for vertically moving the charging tank 20 is used. Other mechanisms of the apparatus are the same as those of the apparatus of the above embodiment.

Experiment 1

A pail can of 20 liters is used as the material tank 32 and putty for correcting the dynamic unbalance of a rotary body was used as a high-viscous material (M) of 4500 poise (at 30° C). The putty (M) was fed from the material tank 32 into the charging tank 20 consisting of an aluminum cylinder (φ: 125, length: 350). The pressure of the air cylinder 45 was 3 kg/cm².

As a result, the putty (M) was fed from the material tank 32 into the charging tank 20 in three minutes and air did not permeate into the putty (M).

Experiment 2

Putty having a specific gravity of 2.1 g/cm³ was charged from the material tank 32 into the charging tank 20 at a speed of 1 kg/min. The relationship between the viscosity of putty (M) and the nozzle diameter was examined, on condition that the vol % of air was made less than 3 with respect to the volume of putty (M) fed from the material tank 32 to the charging tank 20.

Figure 10:
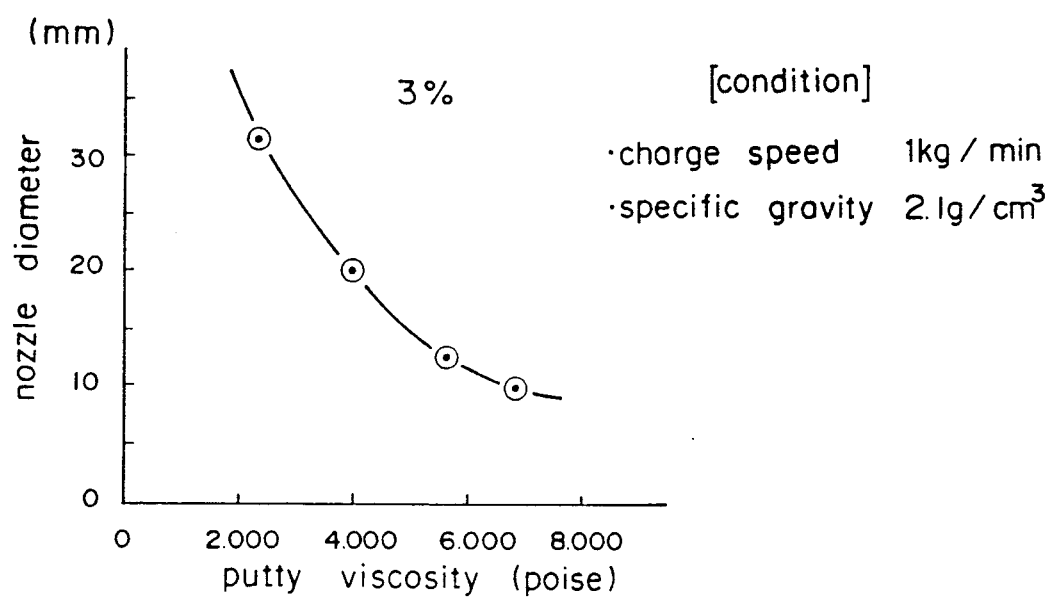
FIGS. 10 and 11 are diagrams showing experimental results.

The result is as shown in FIG. 10. It was confirmed that the nozzle diameter was preferably 20 mm when the viscosity of putty (M) was 4000 poise.

Experiment 3

Putty (M) was fed from the material tank 32 to the charging tank 20 at a speed of 1 kg/min in the atmospheric pressure. The specific gravity of putty (M) was 2.1 g/cm³; the viscosity thereof was 4500 poise; thixotropy index was 2.0. The relationship between the change of the nozzle diameter and vol % of air with respect to the putty was examined.

Figure 11:
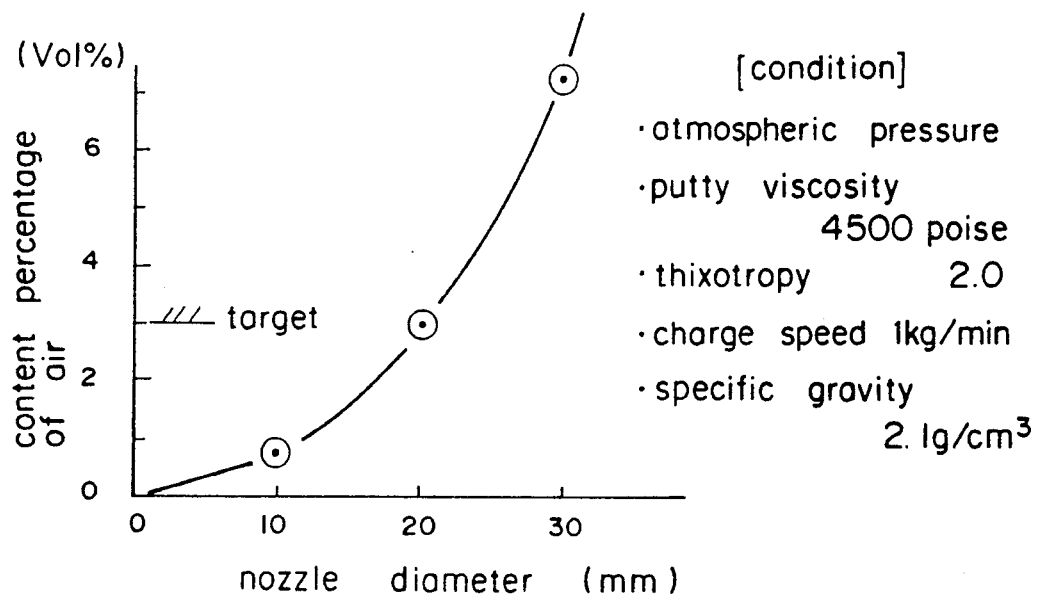

The result is as shown in FIG. 11. It was confirmed that the nozzle diameter was preferably 20 mm in order to make the vol % of air 3%.

As apparent from the foregoing description, according to the method and apparatus, of the present invention, air does not permeate into a material when it is fed from the material tank into the charging tank. Further, while the material is being fed, air which has permeated thereinto is released. Since air existing in the charging tank and in a high-viscous material, or putty can be removed, the method and apparatus of the present invention can be used to solve the problem of the conventional art. That is, the same amount of the material is constantly supplied from the apparatus to a rotary body or the supply of putty is not interrupted. Consequently, the operation for correcting the dynamic unbalance of the rotary body can be accurately accomplished.

Compared with the conventional method in which a spoon or a spatula is used, the amount of material loss is reduced and the period of time required for putty feeding is greatly reduced.

Conventionally, an operator uses gloves or protecting cream in the operation, because a high-viscous material consists of a substance, for example, an epoxy resin likely to cause eczema. But the present invention eliminates the need for the operator to use them, because the operator seldom touch the material.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for charging a high-viscous material in a material tank into a charging tank comprising the steps of:
   connecting said charging tank with an exhaust pump through an exhaust adaptor;
   pressurizing air in said high-viscous material tank and exhausting air in said charging tank;
   extruding, through a nozzle, said high-viscous material compressed by pressure application in said material tank to said charging tank in a pressure-reduced state; and
   dropping said high-viscous material in droplets.

2. A method as claimed in claim 1, wherein said high-viscous material has a viscosity of more than 4000 poise at an atmospheric temperature of 30° C.

3. A method as claimed in claim 2, wherein said high-viscous material has thixotropy.

4. A method as claimed in claim 1, wherein said high-viscous material is used as a member for correcting the dynamic unbalance of a rotary body.

5. A method for charging a high-viscous material in a material tank into a charging tank comprising the steps of:
   connecting said charging tank with an exhaust pump through an exhaust adaptor;
   exhausting air in said charging tank;
   pressurizing air in said material tank;
   extruding, through a nozzle, said high-viscous material compressed by pressure application in said material tank to said charging tank in a pressure-reduced state; and
   dropping said high-viscous material in droplets.

6. A method as claimed in claim 5, wherein said high-viscous material has a viscosity of more than 4000 poise at an atmospheric temperature of 30° C.

7. A method as claimed in claim 6, wherein said high-viscous material has thixotropy.

8. A method as claimed in claim 5, wherein said high-viscous material is used as a member for correcting the dynamic unbalance of a rotary body.

9. An apparatus for charging a high-viscous material in a material tank into a charging tank comprising:
   a material tank for extruding high-viscous material from a discharge opening in a pressure-applied state by a pressure applying piston movably positioned with respect to said material tank;
   a nozzle, connected with the discharge opening of said material tank, for discharging the high-viscous material;
   a charging tank into which the high-viscous material extruded and dropped from said material tank is charged;
   an exhaust adaptor mounted on said charging tank and adapted to be connected with the discharge opening of said nozzle;
   a pump, connected with said exhaust adaptor, for exhausting air in said charging tank and said exhaust adaptor so as to provide a pressure-reduced state; and
   crushing means, provided on said nozzle, for crushing, extruding, and dropping the high viscous-material in droplets into said charging tank;
   said material being charged from the material tank into the charging tank by generating a negative pressure in the charging tank while the pressure in the material tank is increased through operation of said piston, and the high-viscous material having a viscosity of more than 4000 poise at an atmospheric temperature of 30° C.

10. An apparatus for charging a high-viscous material in a material tank into a charging tank comprising:
- a material tank for extruding the high-viscous material from a discharge opening in a pressure-applied state by a first pressure applying piston movably positioned with respect to said material tank;
- a nozzle, connected with the discharge opening of said material tank, for discharging the high-viscous material;
- a charging tank into which the high-viscous material extruded and dropped from said material tank is charged;
- an exhaust adaptor mounted on said charging tank and adapted to be connected with the discharge opening of said nozzle;
- a pump, connected with said exhaust adaptor, for exhausting air in said charging tank and said exhaust adaptor so as to provide a pressure-reduced state;
- crushing means, provided on said nozzle, for crushing, extruding, and dropping the high viscous-material in droplets into said charging tank;
- the high-viscous material being used as a member for correcting the dynamic unbalance of a rotary body, and the charging tank being mounted on a discharge device comprising a microgear pump and a discharge nozzle, and a second pressure applying piston mounted on the charging tank for aiding in discharge of the high-viscous material from the charging tank.

11. An apparatus as claimed in claim 9, including means for discharging the high-viscous material from the charging tank so that the high viscous material can be used to correct dynamic imbalance of a rotary body, said high-viscous material having thixotropy.

12. An apparatus as claimed in claim 10, including means for vibrating the charging tank, and wherein the high-viscous material that is to be used to correct the dynamic unbalance of said rotary body consists of a one-can epoxy resin compound containing as main components an epoxy resin, a hardening agent, a hardening accelerator, an inorganic filler, and a thixotropy imparting agent in which said hardening agent is dicyandiamide or organic dibasic acid dihydrazide; said hardening accelerator being a compound containing a tertiary amino group obtained by the reaction of multifunctional epoxy compound, a compound whose molecule contains a tertiary amino group and one or more active hydrogens, and carboxylic anhydride.

* * * * *